United States Patent Office 3,052,521
Patented Sept. 4, 1962

3,052,521
PROCESS OF PREPARING CALCIUM ALUMINIDE
Alden J. Deyrup, West Goshen Township, Chester County, Pa., assignor to E. I. du Pont de Nemours and Company, Wilmington, Del., a corporation of Delaware
No Drawing. Filed July 14, 1958, Ser. No. 748,118
6 Claims. (Cl. 23—204)

This invention relates to the production of calcium aluminide and is more particularly concerned with a process for preparing crystalline calcium aluminide from fused calcium-aluminum alloy and with the novel calcium aluminide products obtained.

Calcium metal has known utility as a reducing agent in chemical syntheses and metallurgical processes. However, its relatively high reactivity and volatility, and lack of stability in air or water, are frequently a disadvantage. These properties can be improved by alloying the calcium with aluminum, but the reactivity is still such that the alloy must be stored and used with care. Calicum-aluminum alloy can be prepared by melting the elements together in an inert atmosphere. This will be referred to as fused calcium-aluminum alloy. The fused alloy is a brittle mass of metallic appearance whose properties approach those of pure calcium as the proportion of calcium is increased.

From the published phase diagrams of the calcium-aluminum system it is known that the intermetallic compound $CaAl_2$ is capable of existence as a component of alloys containing about 15% to about 73% calcium by weight. Attempts to make this compound by melting together calcium and aluminum in an atomic weight ratio of 1:2 yield a brittle mass of metallic appearance which reacts with water or upon exposure to moist air to form calcium hydroxide and aluminum hydroxide.

It is an object of this invention to prepare calcium aluminide of improved properties. Another object is to prepare stable suspensions of calcium aluminide in water. A further object is to provide a process for preparing new and useful forms of calcium aluminide. Other objects of the invention will become apparent from the specification and claims.

In accordance with the present invention, calcium aluminide is prepared in the form of fine crystals from fused calcium-aluminum alloy, containing over 40% by weight of calcium, by reacting the fused alloy with water at controlled pH in the range of 3 to 6 pH until crystalline calcium aluminide particles are produced, and then recovering the crystalline calcium aluminide from the reaction mixture. The fused alloy starting material can be prepared by any available method for preparing calcium-aluminum alloy, but should contain over 40% of calcium for the desired result. A substantial excess of calcium over that required for calcium aluminide, which contains about 43% calcium and 57% aluminum, is wasteful, so calcium-aluminum alloy containing about 40% to 50% of calcium and 60% to 50% of aluminum is preferable. However, a range of about 0.7 to 3 parts calcium to 1 part aluminum by weight is suitable.

A controlled pH of 3 to 6 is essential for the production of crystalline calcium aluminide particles. Calcium aluminide particles are increasingly reactive at pH values below 3 and, if produced under these conditions, are consumed as rapidly as they are formed. The same is true at pH values above 9. Calcium-aluminum alloy reacts with water to form calcium hydroxide and aluminum hydroxide. The presence of hydrolytic calcium hydroxide raises the pH above 9 to where the calcium aluminide particles react rapidly. Although calcium aluminide particles are surprisingly stable to water in the pH range of 6 to 9, they cannot be produced satisfactorily from calcium-aluminum alloy in this range. Therefore, it is highly unexpected to find that crystalline calcium aluminide particles are produced rapidly in aqueous solutions at pH 3 to 6 from fused calcium-aluminum alloy of the composition indicated.

Within the pH range of 3 to 6, crystalline calcium aluminide is produced as fine particles with such rapidity that the calcium aluminum alloy appears to disintegrate. The solution may be kept mildly acid by addition of acid or acidic salts. Suitable buffer solutions for maintaining a pH range of 3 to 6 are well-known and are described in chemical reference books. Preferably the calcium-aluminum alloy is broken into small pieces to increase the exposed surface and the mixture is stirred to keep the solution in contact with the alloy uniform. The calcium aluminide is obtained as fine brittle crystals. More vigorous stirring will give smaller particle sizes and the crystals are easily ground to particle sizes below one micron. Grinding can be combined with the mixing, as by ball-milling, to give extremely small particle sizes directly from the alloy. However, dispersions are preferably prepared by first producing the crystals in the form of a fine powder, separating the powder from the reaction mixture, and then grinding the powder in water buffered to pH 3 to 9.

Calcium aluminide can be recovered from the mixture by conventional methods, taking care to maintain a pH of 3 to 9 in any water with which it is in contact. Thus any remaining coarse particles of fused alloy can be separated by screening or other classifying means and the mixture filtered to recover the crystalline powder. The filter cake can then be washed with mildly acidified water (pH 3–6) and dried. A final rinsing with acetone or anhydrous alcohol will give a purer product and facilitate drying.

This process provides a surprisingly stable form of calcium aluminide which is substantially pure, crystalline $CaAl_2$. The product is unexpectedly stable in water within the pH range of 3 to 9, the rate of reaction at pH 7 to 9 being less than 0.001 percent by weight per hour. The product is also relatively stable to air of high humidity at room temperature, showing only a negligible gain in weight after exposure for several hours. The product is unaffected by heating in air at temperatures up to 400° C. for 30 minutes, and there is only about 3% gain in weight at temperatures as high as 600° C. The product becomes quite reactive in water below pH 2 or about pH 10, but the reactivity can be controlled more effectively than reactive finely divided metals such as aluminum, zinc or calcium. When placed in pure water or unbuffered solutions, the calcium aluminide reacts slowly to gradually increase the pH to the unstable range, whereupon there is an accelerated reaction.

The crystalline calcium aluminide shows strong reducing properties. In acid solutions, copper, lead and silver salts are reduced to cohesive masses of metal powder and chromic salts are reduced to chromous salts. The nitrate ion is reduced to nitric oxide as one product. Depending upon the conditions, sulfites may be reduced to sulfur, hydrogen sulfide or dithionites (hydrosulfites). In ammoniacal solutions, copper, zinc and silver salts are reduced to metal powders.

The crystalline calcium aluminide can readily be ground to extremely small particle size in water of controlled pH within the range of 3 to 9 to form suspensions. Thus the crystals obtained without grinding, which have a bright metallic appearance, can be ball-milled in water of pH 3 to 9 to form suspensions of such extremely fine particle size that the suspensions appear dark colored or even black. Alternatively, the fused alloy can be mixed with water of pH 3 to 6 and simultaneously ground, as by ball-milling in a ball mill venter to permit escape of small amounts of hydrogen, to give such a suspension directly. The suspended calcium aluminide reacts only slowly with water, so long as the pH is maintained within the range of 3 to 9 pH. In water buffered to maintain the pH within the range of 7 to 9 pH, these suspensions of calcium aluminide react so slowly that the suspensions can be stored for at least one year without serious decomposition of the calcium aluminide. Suitable buffer solutions for the pH ranges mentioned are, of course, well known to the art.

The suspensions of calcium aluminide of extremely small particle size have the property of reacting under alkaline conditions (above pH 9) to produce small bubbles of non-toxic gas. For example, addition of less than 1 percent of calcium aluminide in aqueous suspension to a concrete mix as a foaming agent will produce "floating concrete," i.e., concrete of less density than water.

Crystalline calcium aluminide is thermally stable in comparison with other reducing agents. Its relatively slow rate of reaction under normal conditions makes it quite safe for use in reducing reactions. However, care should be taken that the adiabatic temperature rise does not result in temperatures above 2000° C. unless special safety precautions are observed. The thermite reaction between calcium aluminide and ferric oxide requires ignition temperatures above about 800° C. Calcium aluminide burns non-explosively in air with an intense white light when ignited with a hot flame.

The following examples, in which parts are by weight unless otherwise specified, illustrate specific embodiments of the invention:

EXAMPLE 1

Fused calcium-aluminum alloy was prepared by melting a mixture of the substantially pure metals. Analysis of this alloy showed, for a top section, 45.5% Ca. 54.0% Al and 0.62% $SiO_2$; and for a bottom section, 40.5% Ca, 58.3% Al and 0.13% $SiO_2$. The alloy was coarsely crushed and 20 parts were mixed with a solution containing 10 parts acetic acid, 13.6 parts sodium acetate and 10 parts calcium chloride in 200 parts water. The mixture was stirred rapidly for 4 hours, the pH remaining at 5 during this period. The calcium-aluminum alloy substantially disappears, leaving a suspension of fine flakes in the solution. The suspension was black due to extremely small particles of calcium aluminide. The suspension was filtered and washed with 1% acetic acid, then rinsed with acetone and dried. During the filtration the product was separated into a "light" fraction of particles readily dispersed and a "heavy" fraction of larger particles, principally consisting of an unattacked alloy. The light fraction was 67% and the heavy fraction was 23% of the starting alloy. This heavy fraction could be treated as before to give additional light fraction. The light fraction analyzed as follows:

Ca: 41.66, 41.96%
Al: 56.75, 56.95%

The analysis shows an average molar ratio of Al/Ca of 2.021/1. The yield was 83% based on the original calcium alloy starting material. The product was a fine flake crystalline powder having a melting point of 1079° C. and a specific gravity of 2.35. It was shown to be cubic crystalline by X-ray analysis. The larger particles appeared bright metallic and were characterized by the presence of triangular-shaped plates when viewed with a microscope. The smaller particles appeared dark gray or black and formed dark colored suspensions, possibly because of diminished light reflectance for particle thicknesses smaller than the wave length of light.

The stability of the crystalline calcium aluminide in water was determined by placing 20 to 40 mg. of crystals, ranging in size from less than 1 micron to 300 microns in maximum dimension, in various buffer solutions at room are shown in Table I. These show that the crystalline calcium aluminide particles are surprisingly unreactive with water in the pH range 3 to 9 and that maximum stability is at about pH 8.3.

Table I
REACTIVITY OF $CaAl_2$ WITH WATER AS A FUNCTION OF pH

| pH | Buffer Type | Time, Hrs. | Gas Evolution, ml. | Rate of Reaction, percent/Hr. |
|---|---|---|---|---|
| 1.0 | HCl | 2 | 1.3 | 2 |
| 1.5 | Oxalate | 2 | 1.0 | 2 |
| 1.75 | Phosphate | 2 | 1.9 | 3 |
| 2.6 | do | 170 | 2.0 | .04 |
| 3.1 | Phosphate-Citrate | 120 | 1.0 | .03 |
| 3.9 | do | 120 | 1.0 | .03 |
| 4.1 | do | 72 | .1 | .005 |
| 5.0 | do | 120 | .03 | .001 |
| 6.0 | do | 120 | .03 | .001 |
| 7.0 | do | 120 | .01 | .0003 |
| 8.1 | do | 120 | .003 | .0001 |
| 8.3 | do | 360 | .003 | .00003 |
| 9.2 | Borate | 72 | .005 | .0002 |
| 9.7 | Carbonate | 72 | .47 | .02 |
| 10.0 | do | 24 | >4.0 | >.5 |
| 10.1 | do | 7 | 1.4 | .7 |

The stability of the crystalline calcium aluminide in humid air was determined by measuring the gain in weight after exposure to air of 87% humidity at room temperature for 504 hours. There was an increase in weight of 3.4%, showing the product to be relatively stable in air at ordinary humidities. The product was heated in air for 30 minutes at various temperatures. There was no gain in weight after heating at 200°, 300° or 400° C. After heating 30 minutes at 500° C. the weight gain was 1%. A mixture of the product with ferric oxide did not react up to about 800° C., but ignition with a thermite igniter led to a reaction which formed iron spheres in a molten slag. A mixture of the product and zinc fluoride did not react when gently heated, but at higher temperature the mixture deflagrated with warning of violence.

EXAMPLE 2

Example 1 was repeated with fused calcium-aluminum alloy starting material containing about 73% Ca. The alloy reacted rapidly to form crystalline calcium aluminide as before, but the yield was only about 25% based on the calcium content of the alloy used.

EXAMPLE 3

A suspension was prepared by ball-milling crystalline calcium aluminide in water at pH 7–8, with boric acid added as buffering agent. The suspension was black. This was added to a 1 cement:1 sand mix in proportions of 0.06 part calcium aluminide per 100 parts of Portland cement. The mix was cast in the form of a bar, set in a quiescent state and allowed to cure. The resulting concrete contained a multitude of small gas bubbles and floated on water. It was of adequate strength for use as light weight concrete.

Since many different embodiments of the invention may be made without departing from the spirit and scope thereof, it is to be understood that the invention is not limited by the specific illustrations except to the extent defined in the following claims.

I claim:

1. The process for preparing crystalline calcium aluminide ($CaAl_2$) which comprises reacting fused calcium-aluminum alloy containing about 0.7 to 3 parts calcium to 1 part aluminum with water at controlled pH in the range of 3 to 6 pH until crystalline calcium aluminide particles are produced, and then recovering the crystalline calcium aluminide from the reaction mixture.

2. A process as defined in claim 1 wherein said calcium-aluminum alloy contains 40% to 50% calcium and 60% to 50% aluminum.

3. The process for preparing crystalline calcium aluminum alloy containing about 0.7 to 3 parts calcium to 1 part aluminum with an aqueous buffer solution maintained at pH 3 to 6 until crystalline calcium aluminide particles are produced, and then recovering the crystalline calcium aluminide as a powder.

4. The process for preparing crystalline calcium aluminide ($CaAl_2$) which comprises mixing fused calcium-aluminum alloy containing about 0.7 to 3 parts calcium to 1 part aluminum with an aqueous buffer solution maintained at pH 3 to 6 until a dark colored suspension of crystalline calcium aluminide is formed in said solution, and separating a suspension of fine particles of crystalline calcium aluminide from larger particles.

5. The process for preparing a suspension of calcium aluminide ($CaAl_2$) particles in water which comprises reacting fused calcium-aluminum alloy containing about 0.7 to 3 parts calcium to 1 part aluminum with water at controlled pH in the range of 3 to 6 pH to produce crystalline calcium aluminide particles and grinding the crystalline calcium aluminide in water at controlled pH in the range of 3 to 9 pH until a dark colored suspension is obtained.

6. The process for preparing a suspension of calcium aluminide ($CaAl_2$) particles in water which comprises grinding crystalline calcium aluminide in water at controlled pH in the range of 3 to 9 pH until a dark colored suspension is obtained.

References Cited in the file of this patent
UNITED STATES PATENTS

| | | |
|---|---|---|
| 857,146 | Askenasy et al. | June 18, 1907 |
| 934,379 | Willson et al. | Sept. 14, 1909 |
| 1,954,117 | Caldwell | Apr. 10, 1934 |
| 1,983,021 | Eaton | Dec. 4, 1934 |
| 2,017,022 | Roos | Oct. 8, 1935 |

FOREIGN PATENTS

| | | |
|---|---|---|
| 633,197 | France | Oct. 22, 1927 |

OTHER REFERENCES

Mellor: "Comprehensive Treatise on Inorganic and Theoretical Chemistry," 1923, vol. III, pages 638–639.

"Chemical Abstracts," vol. 33, page 8466 (1939).

Mantell et al.: "Calcium," 1945, page 35.

UNITED STATES PATENT OFFICE
CERTIFICATE OF CORRECTION

Patent No. 3,052,521                 September 4, 1962

Alden J. Deyrup

It is hereby certified that error appears in the above numbered patent requiring correction and that the said Letters Patent should read as corrected below.

Column 1, lines 21 and 22, for "Calicum-aluminum" read -- Calcium-aluminum --; column 2, line 48, for "about" read -- above --.

Signed and sealed this 6th day of August 1963.

(SEAL)
Attest:

ERNEST W. SWIDER                 DAVID L. LADD
Attesting Officer                 Commissioner of Patents